Feb. 15, 1944.    G. E. BARSTOW    2,341,972
SWAGING MACHINE
Filed Aug. 15, 1940    12 Sheets-Sheet 5
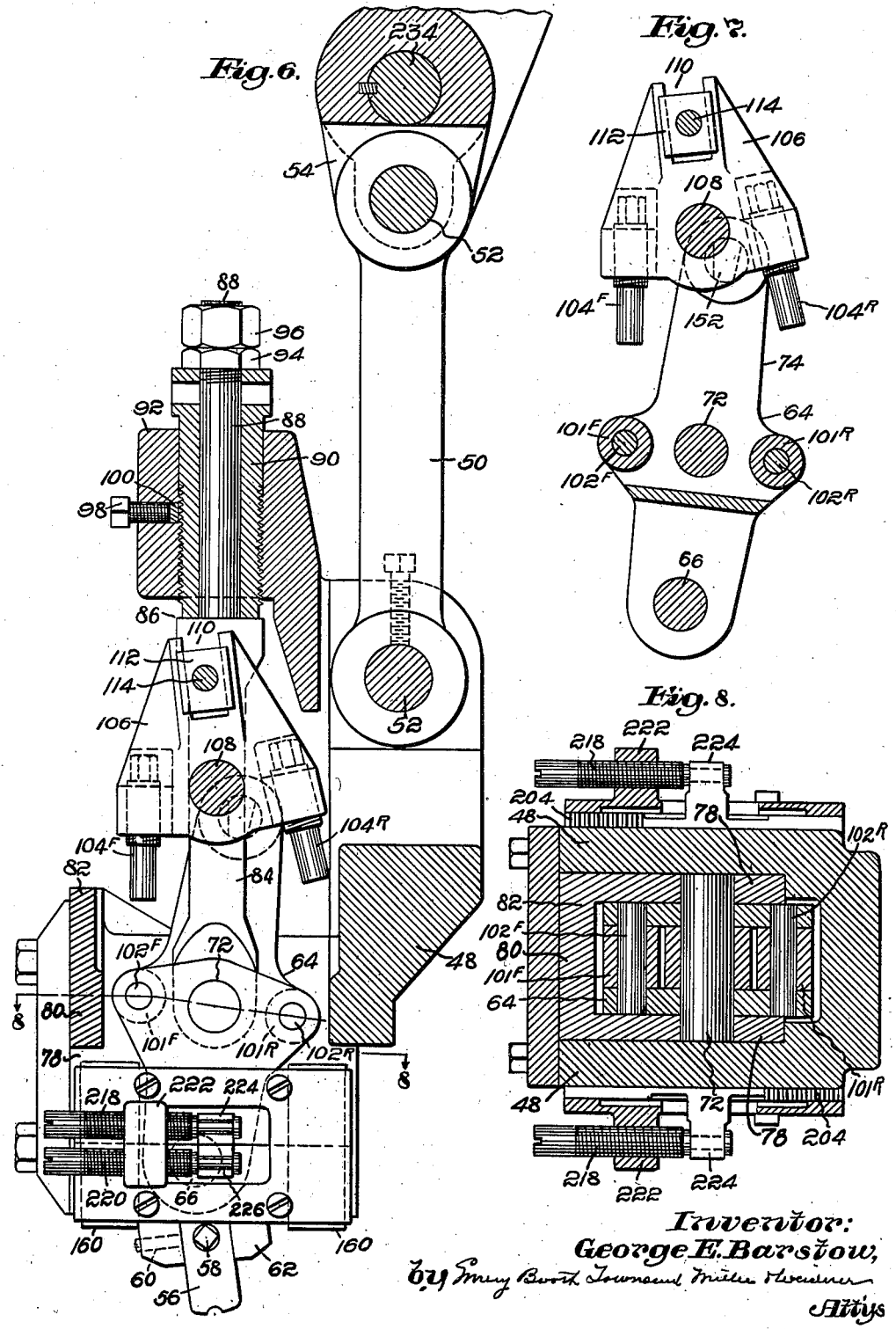
Inventor:
George E. Barstow, Feb. 15, 1944.　　　G. E. BARSTOW　　　2,341,972
SWAGING MACHINE
Filed Aug. 15, 1940　　　12 Sheets-Sheet 6

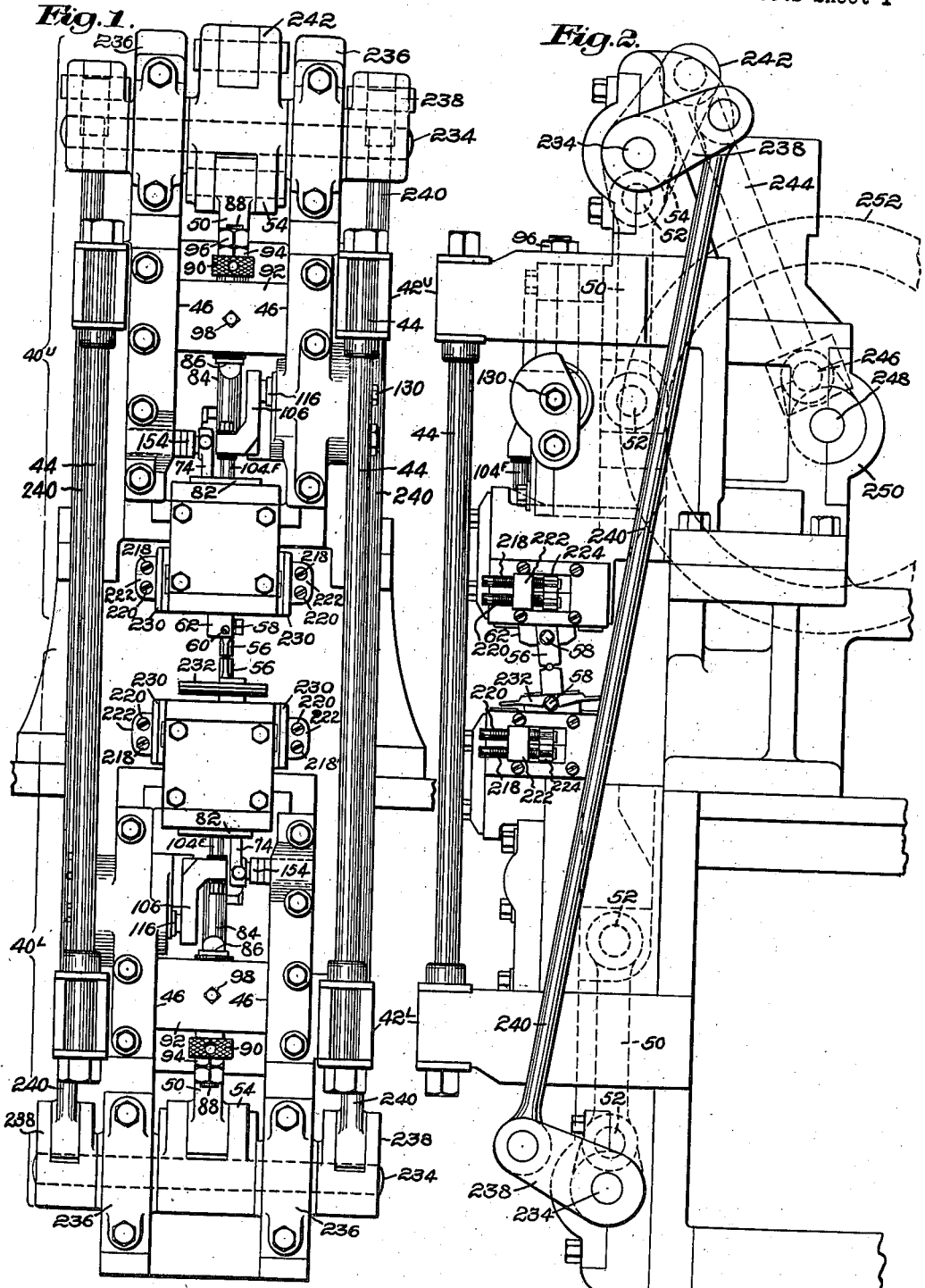
Feb. 15, 1944.    G. E. BARSTOW    2,341,972
SWAGING MACHINE
Filed Aug. 15, 1940    12 Sheets-Sheet 1
Inventor:
George E. Barstow
Attys

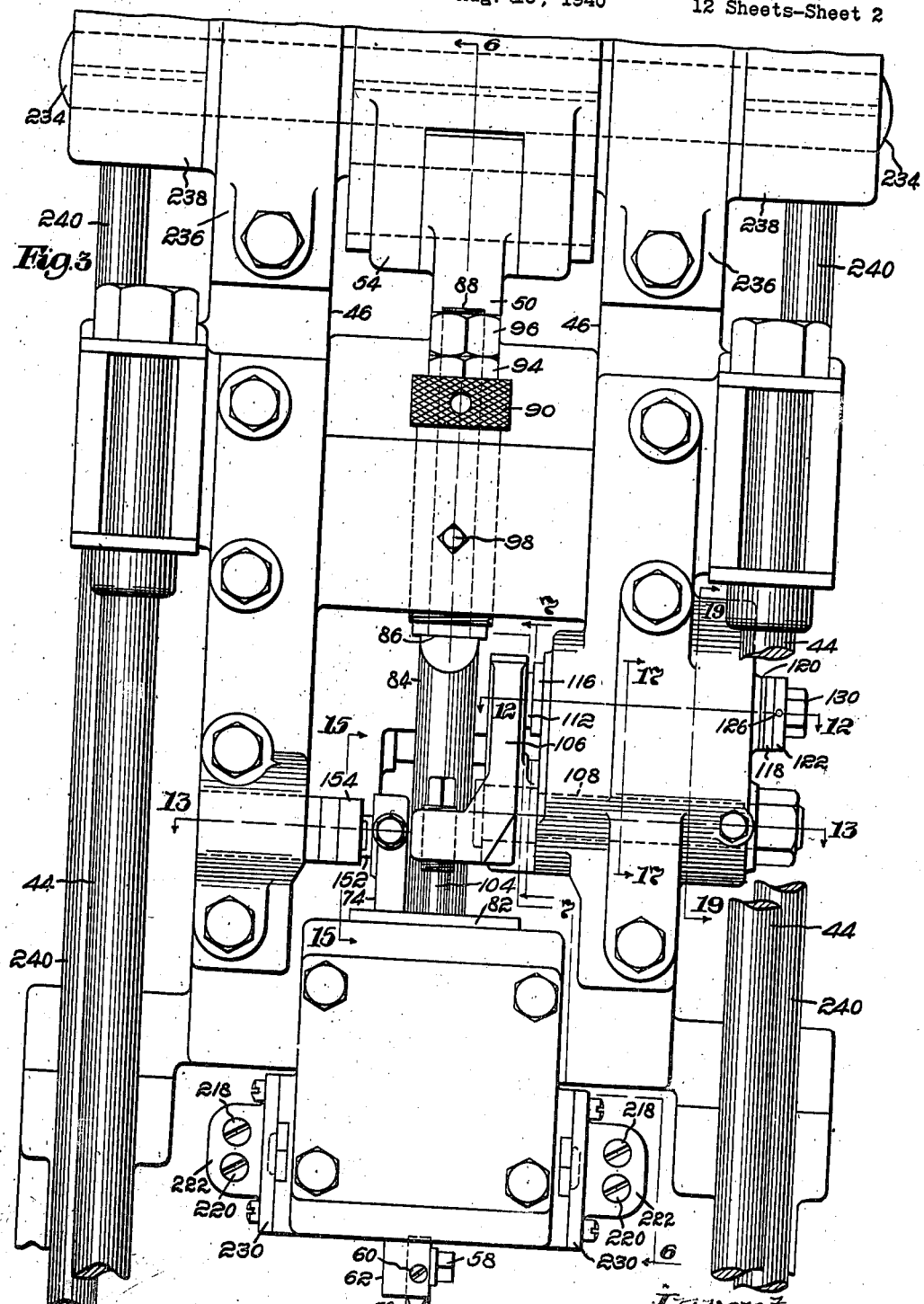

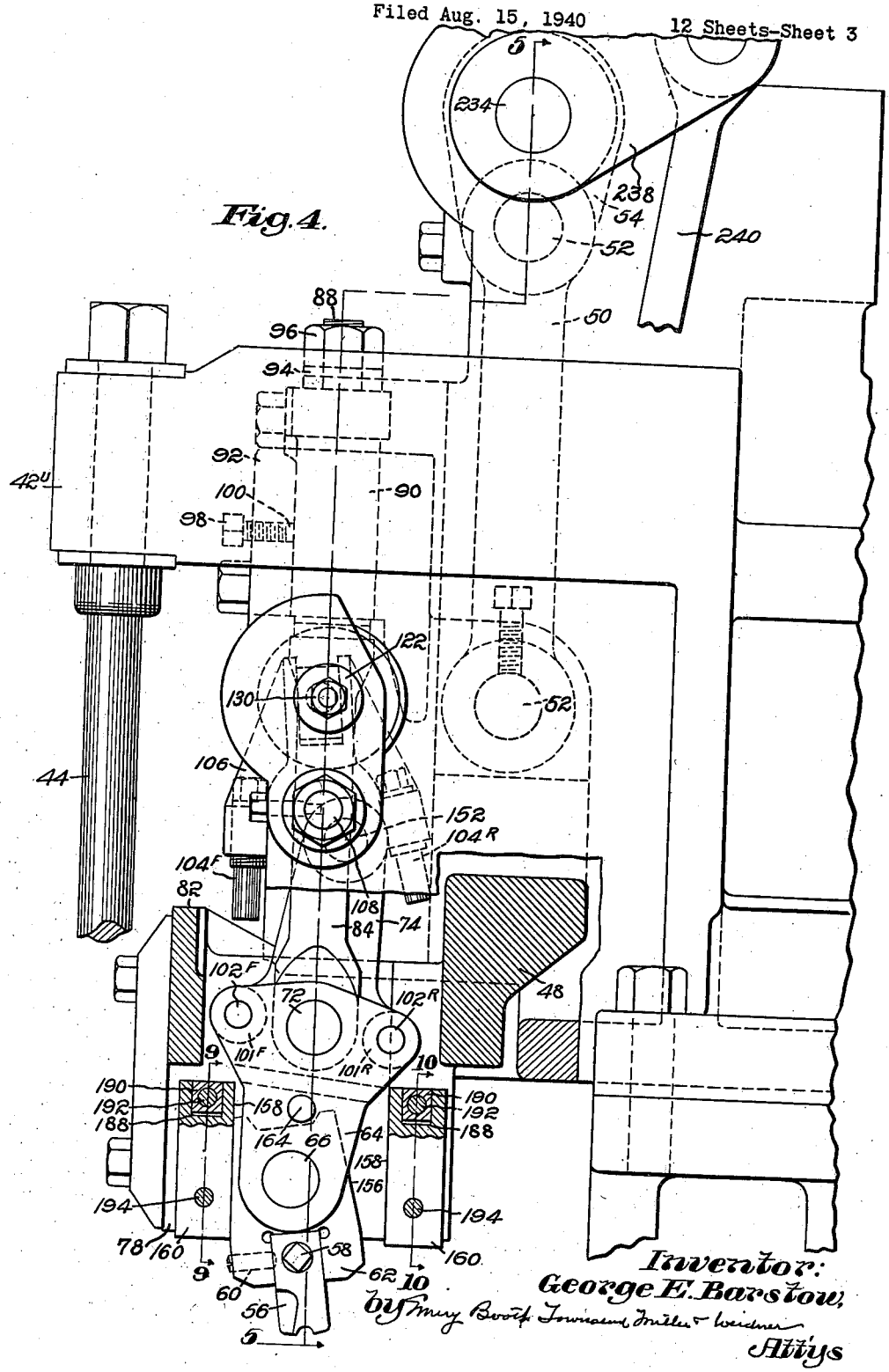

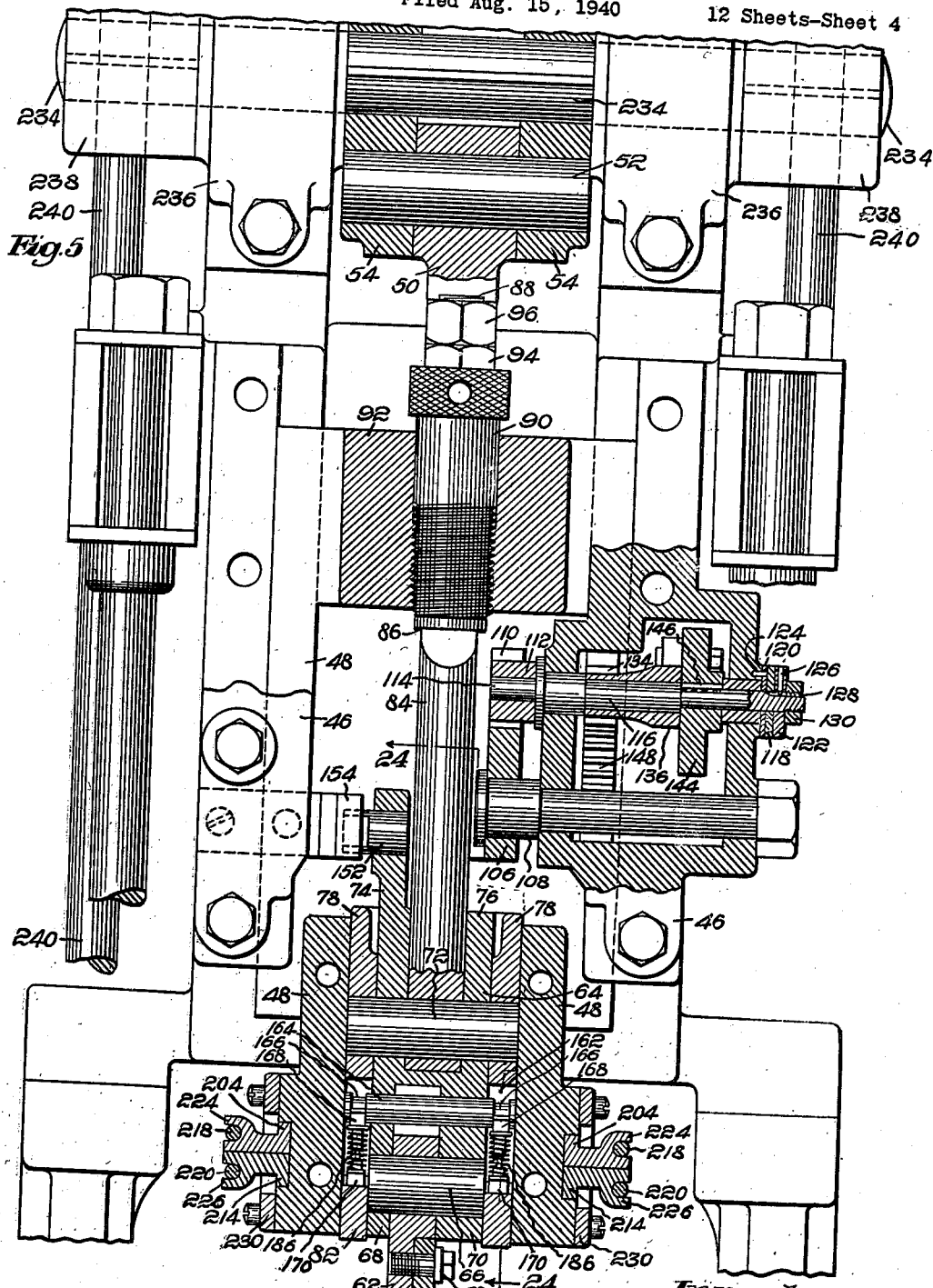

Inventor:
George E. Barstow,

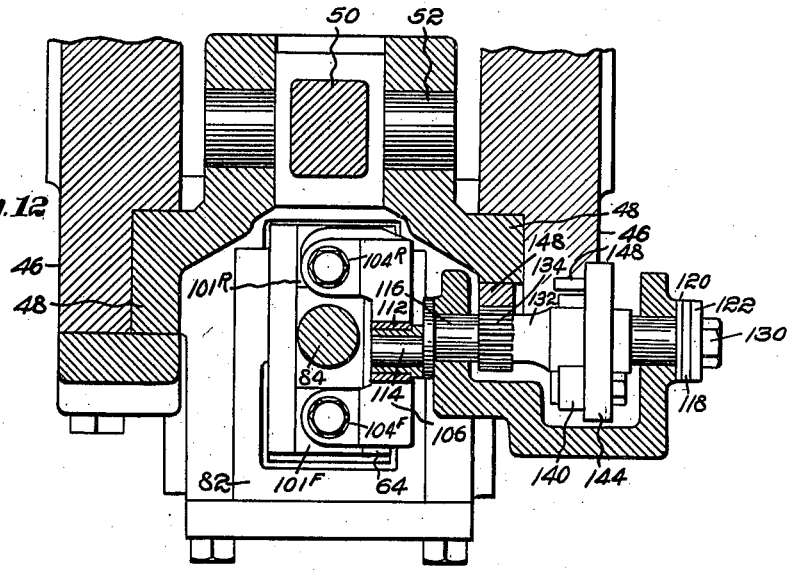
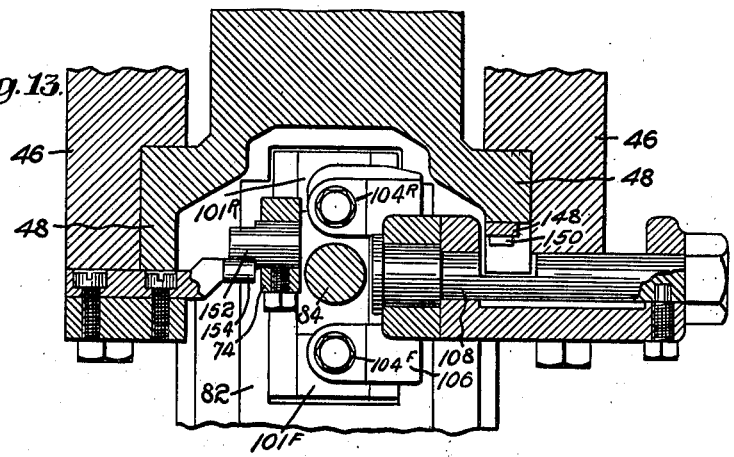
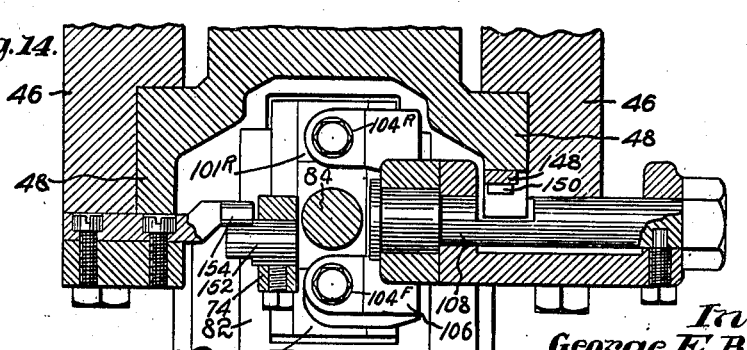

Feb. 15, 1944.　　　　G. E. BARSTOW　　　　2,341,972
SWAGING MACHINE
Filed Aug. 15, 1940　　　12 Sheets-Sheet 8
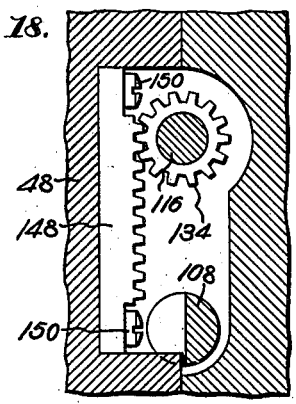
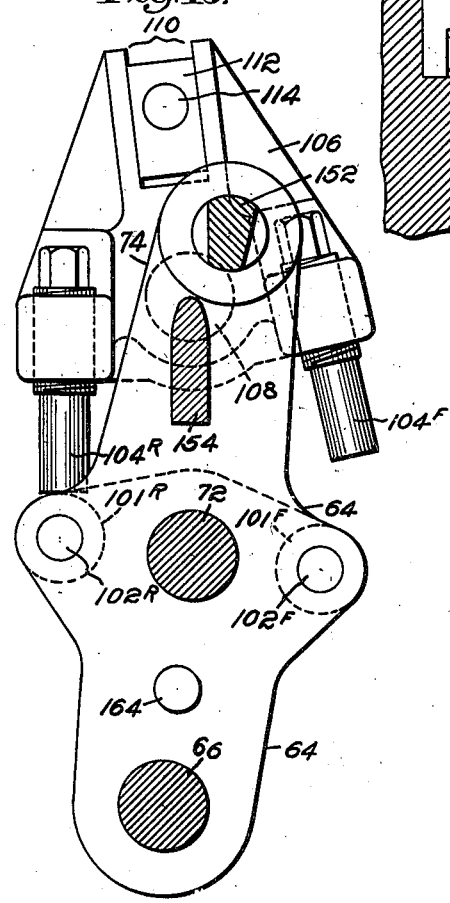
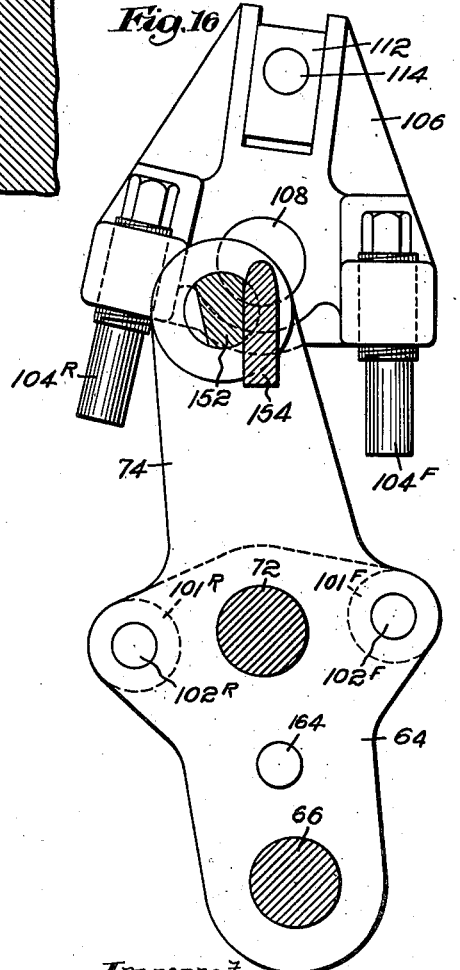

Feb. 15, 1944. G. E. BARSTOW 2,341,972
SWAGING MACHINE
Filed Aug. 15, 1940 12 Sheets-Sheet 9
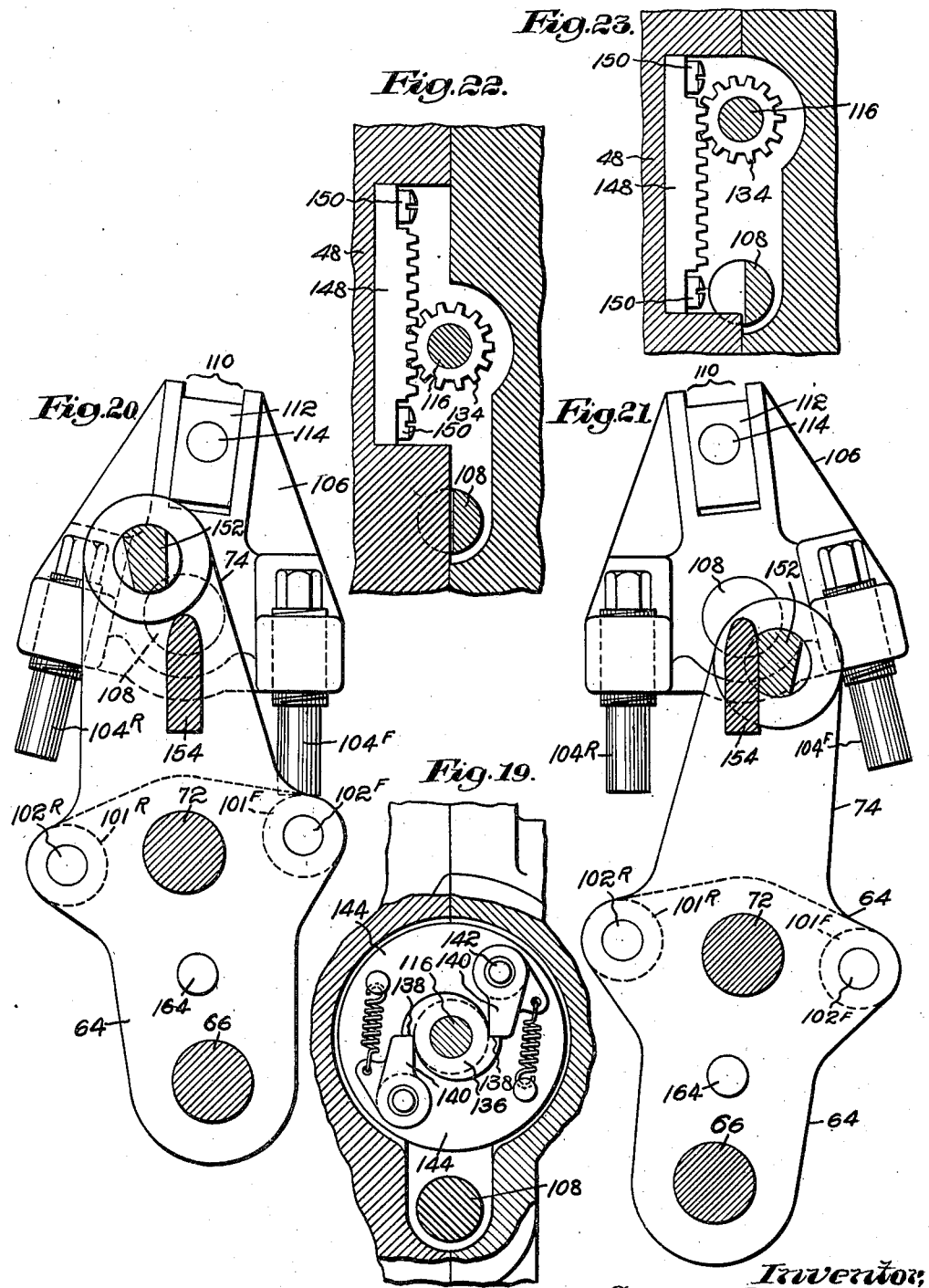
Inventor,
George E. Barstow.

Feb. 15, 1944.   G. E. BARSTOW   2,341,972
SWAGING MACHINE
Filed Aug. 15, 1940   12 Sheets-Sheet 10
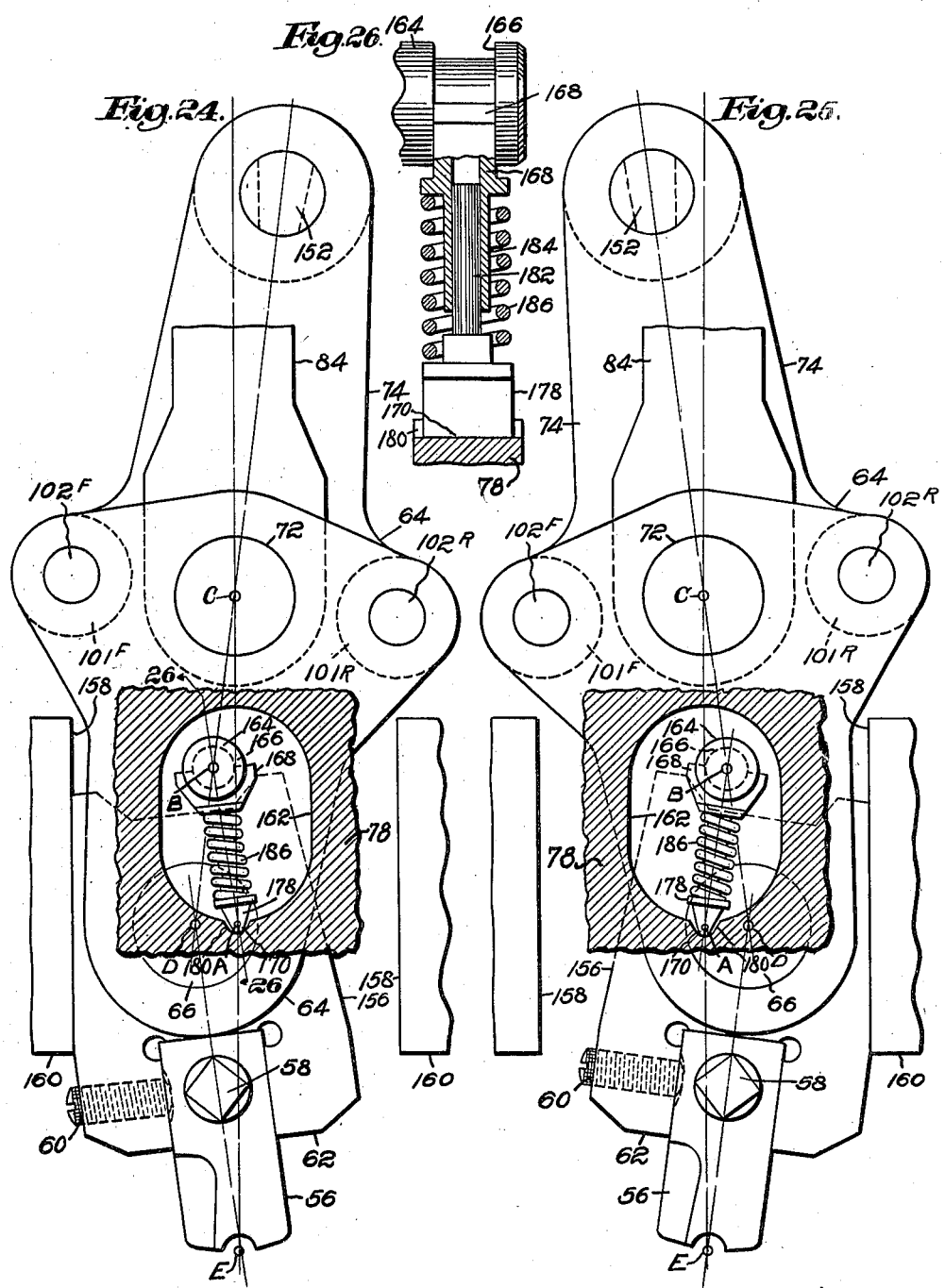
Inventor:
George E. Barstow,
by Emery Booth Townsend Miller Rhodes
Attys Feb. 15, 1944. G. E. BARSTOW 2,341,972
SWAGING MACHINE
Filed Aug. 15, 1940 12 Sheets-Sheet 11
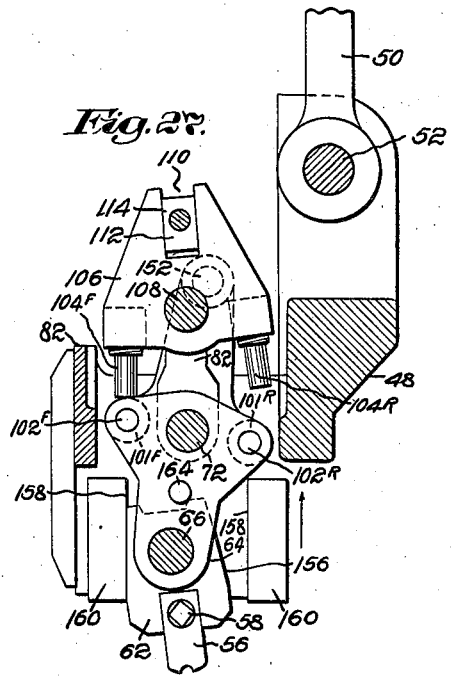
Fig. 27.
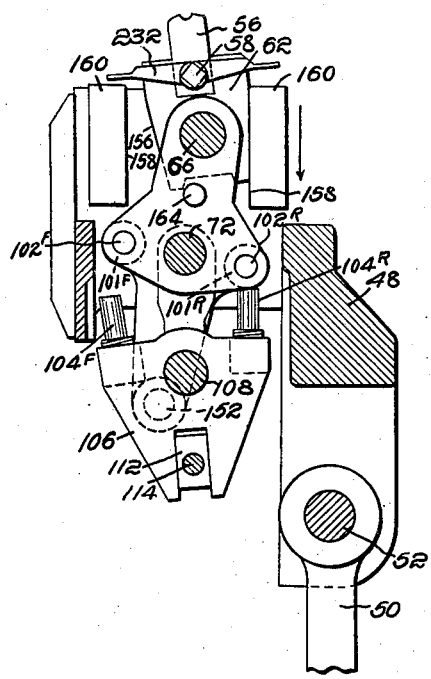
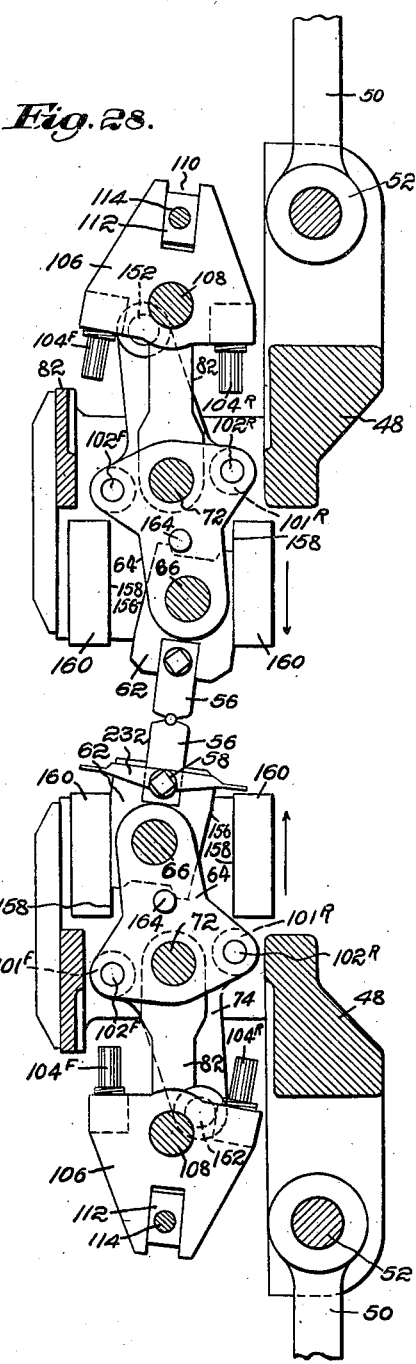
Fig. 28.
Inventor:
George E. Barstow
by Emery Booth Townsend Miller Providence
Attys Feb. 15, 1944.  G. E. BARSTOW  2,341,972
SWAGING MACHINE
Filed Aug. 15, 1940  12 Sheets-Sheet 12
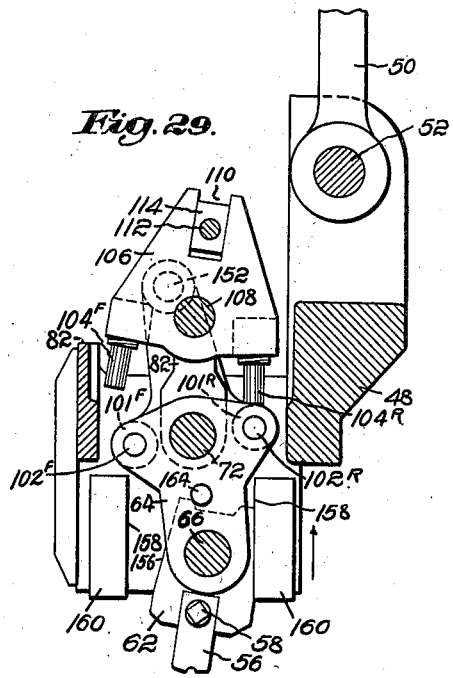
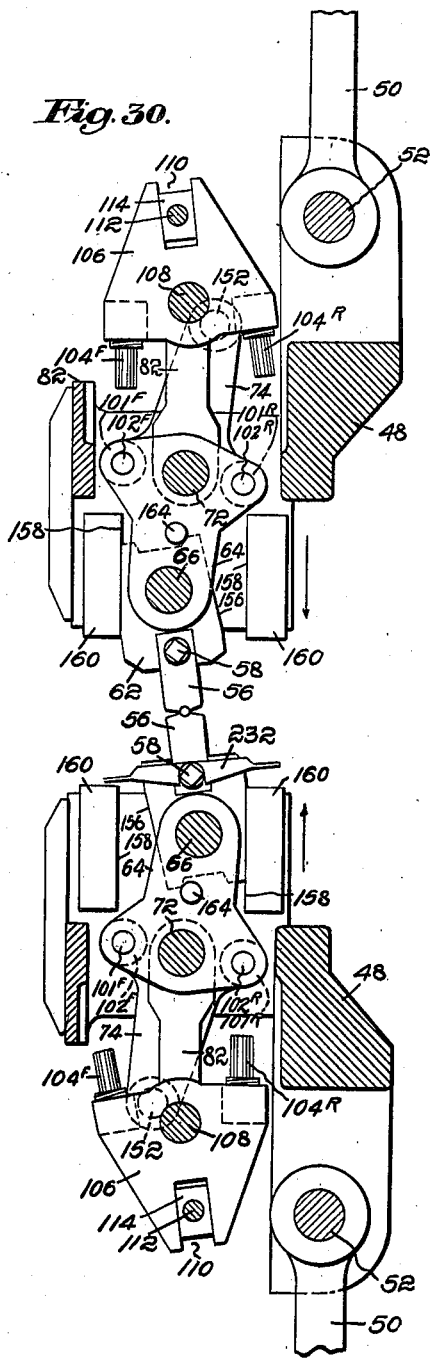
Fig. 29.
Fig. 30.
Inventor:
George E. Barstow,
by Emery Booth Townsend Mettler & Weisner
Attys Patented Feb. 15, 1944

2,341,972

UNITED STATES PATENT OFFICE 2,341,972

SWAGING MACHINE

George E. Barstow, Lakeville, Mass.

Application August 15, 1940, Serial No. 352,768

30 Claims. (Cl. 59—30)

This invention relates to chain making machines of the class in which pre-formed and pre-assembled, interlocked links are completed by welding the joints of the links, and is concerned with a novel swaging machine which smooths and shapes the joint in connection with the welding operation, though the welding itself is no part of this invention.

In accordance with the invention, a previously welded link joint is swaged and shaped by upper and lower, cooperating swaging dies which are caused to move to and from the work in one angular position, then to assume another angular position, and then to move to and from the work in the second position. In other words the dies approach and recede from each other and assume different angular positions about a center between the dies. The fin formed in one angular position of the dies is broken off by the dies when in the other angular position.

In the present example, the machine comprises upper and lower substantially duplicate mechanisms each comprising a guide, a slide guided by said guide, mechanism to reciprocate the slide, a die tripper pivotally supported on the frame to rock about an axis transverse to the motion of the slide, mechanism to utilize the reciprocation of the slide to rock the die tripper, a supporting rod carried by and extending lengthwise of the slide, means for adjusting the rod lengthwise of the travel of the slide and toward and from the work, a fulcrum pin carried by the rod with its axis transverse to the travel of the slide, a die-rocker fulcrumed on the pin and utilizing reciprocation of the slide to cooperate with the die tripper to produce a rocking movement of the die-rocker, a die carrier pivoted on the die-rocker to rock to and fro about an axis transverse to the travel of the slide, die controlling abutments contacted alternately by the die carrier as it rocks to and fro, adjusting means for adjusting the abutments toward and from and angularly with relation to each other, a biasing arrangement including a spring tending to cause the die-rocker to maintain the die carrier in contact with one or the other of the abutments, a die carried by the die carrier and partaking of the reciprocation of the slide and the rocking of the rocker, and a housing carried by the slide and disposed about the die carrier and rocker.

The invention will best be understood by reference to the following description when taken in connection with the accompanying drawings of one specific embodiment thereof while its scope will be pointed out more particularly in the appended claims.

In the drawings:

Fig. 1 is a front elevation of a swaging machine embodying the invention;

Fig. 2 is a side elevation of the same;

Fig. 3 is a front elevation of the upper portion of the machine;

Fig. 4 is an elevation viewed from the right-hand side of Fig. 3;

Fig. 5 is a vertical sectional view on line 5—5 of Fig. 4;

Fig. 6 is a vertical sectional view on line 6—6 of Fig. 3;

Fig. 7 is a vertical sectional view on line 7—7 of Fig. 3;

Fig. 8 is a horizontal sectional view on line 8—8 of Fig. 6;

Fig. 12 is a horizontal sectional view on line 12—12 of Fig. 3;

Fig. 13 is a horizontal sectional view on line 13—13 of Fig. 3;

Fig. 14 is a view similar to Fig. 13, but showing a different position;

Fig. 15 is a vertical sectional view on line 15—15 of Fig. 3;

Fig. 16 is a view similar to Fig. 15 but showing a different position;

Fig. 17 is a vertical sectional view on line 17—17 of Fig. 3;

Fig. 18 is a view similar to Fig. 17, but showing a different position;

Fig. 19 is a vertical sectional view on line 19—19 of Fig. 3;

Fig. 20 is a view similar to Fig. 15 but showing a different position;

Fig. 21 is a view similar to Fig. 16 but showing a different position;

Fig. 22 is a view like Fig. 17;

Fig. 23 is a view like Fig. 18;

Fig. 24 is a vertical sectional view on line 24—24 of Fig. 5;

Fig. 25 is a view similar to Fig. 24, but showing another position;

Fig. 26 is a vertical sectional view on an enlarged scale on line 26—26 of Fig. 24; and Figs. 27 to 30, inclusive, are views illustrating the combined cycle of the upper and lower units.

Figure 9:
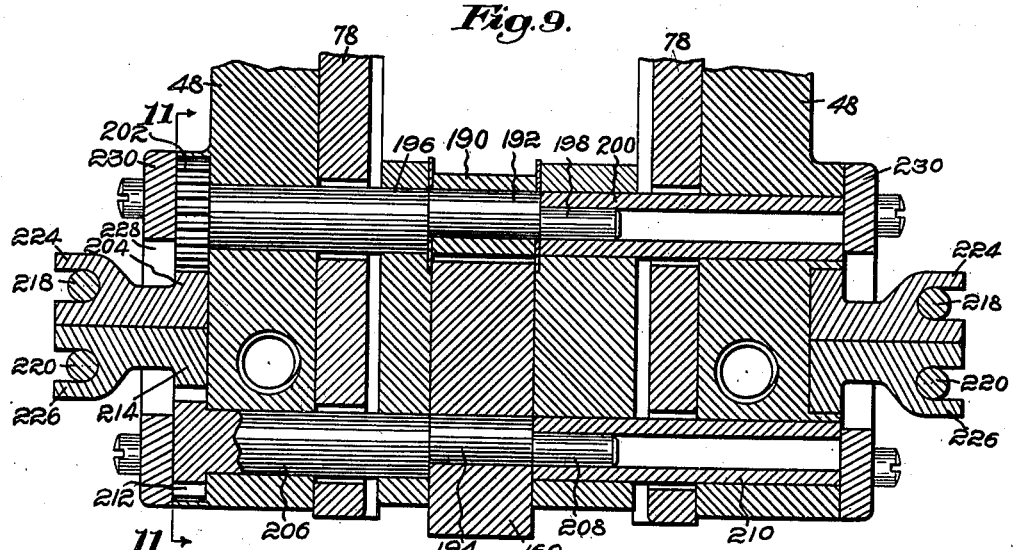
Fig. 9 is a vertical sectional view on line 9—9 of Fig. 4.

Referring to the drawings and to the embodiment of the invention illustrated therein by way of example, it will be observed by reference to Figs. 1 and 2 that the machine is double in the sense that there are upper and lower, opposed units 40U and 40L which, for the most part, have corresponding parts, though one set is inverted with relation to the other, and hence a description of one will suffice for both. However, both units have a common framework which comprises, in a general way, upper and lower parts 42U and 42L connected at the front by the rods 44.

The upper unit will now be described, reference being had at first to Fig. 5 in which it will be noted that the framework presents guides 46 for a slide 48 which is reciprocated vertically as by a link 50 connecting a pivot 52 to a rocking arm 54. The reciprocation of the slide moves a swaging die 56 toward and from the work, and the slide carries mechanism now to be described which causes the die to assume different angular positions with relation to the work.

The die 56 is suitably secured, as by a cap-screw 58 (see Fig. 3) and a set-screw 60 to a die-carrier 62 which (see Fig. 5) is appropriately carried by a die-rocker 64 as by being pivoted on a pin 66 (see Fig. 5) between two downwardly directed arms 68 and 70. The rocker 64 is mounted on a fulcrum pin 72 which passes through two upwardly directed arms 74 and 76 on the rocker, and the ends of the fulcrum pin are received in side walls 78 joined by a front wall 80 of a housing 82 (see Figs. 6 and 8) which houses the rocker and other parts and is U-shaped at its upper portion as shown in Fig. 8, while at its lower portion, below the front wall 80, the side walls 78 are unconnected. The fulcrum pin 72 for the rocker 64 is carried on the slide 48 by appropriate means providing for vertical adjustment of the fulcrum pin with relation to the slide. In the example shown this is conveniently accomplished by passing the fulcrum pin 72 through the lower end of the supporting rod 84 (see Fig. 6) having a shoulder 86 and above said shoulder a reduced portion 88 loosely received in an adjusting sleeve 90 threaded into a yoke 92 at the upper end of the slide 48. Two nuts 94 and 96 threaded onto the upper end of the reduced portion 88 cooperate with the shoulder 86 to prevent endwise movement of the rod, and accidental rotation of the adjusting sleeve 90 is prevented by appropriate means such as a set-screw 98 and a block 100 to prevent damage to the threads on the sleeve. Thus, the rocker 64, the die carrier 62 and the die 56 may be adjusted vertically toward and from the work.

The mechanism for producing the rocking movement of the rocker 64 will now be described, reference being had at first to Fig. 15. The rocker carries two abutments such as rollers 101F and 101R on pins 102F and 102R and cooperating, respectively, with abutments such as pins 104F and 104R carried by a tripper 106 which is mounted to rock about a horizontal axis on a pivot such as a stud 108. Rocking movement of the tripper is produced by appropriate mechanism, now to be described, which utilizes vertical movement of the slide 48 to produce the rocking movement of the tripper.

Still referring to Fig. 15, it will be observed that the tripper 106 is provided with a slot 110 serving as a guide for a slidable block 112 which is mounted to turn on a crank 114, the latter (see Fig. 5) being a part of a crankshaft 116 journaled in the fixed frame. A frictional resistance to rotation of the crankshaft is provided by an appropriate brake such as a leather washer 118 between two metal washers 120 and 122, one held fixed by a pin 124 inserted in the frame, and the other keyed as by a pin 126 in a groove 128 in the crankshaft. A nut 130 threaded onto the outer end of the crankshaft provides the needed axial pressure on the friction surfaces of the brake.

A sleeve 132 (see Fig. 12) loosely mounted on the crankshaft 116 carries at one end a pinion 134 and at its other end a ratchet 136 which (see Fig. 19) has two teeth 138 cooperating with two spring-pressed pawls 140 pivoted on studs 142 on a pawl carrier 144 which, as shown in Fig. 5, is secured as by a key 146 to the crankshaft 116. Referring now to Figs. 17 and 18, it will be observed that the pinion 134 meshes with a rack 148 suitably secured as by screws 150 to the vertically reciprocatory slide 48. The described mechanism utilizes reciprocation of the slide to impart an intermittent or step-by-step rotative movement to the crankshaft by an amount of one-half turn or 180°. This is because, during the travel of the rack in one direction, the pinion (which it will be remembered is fixed to the ratchet) causes the ratchet teeth to drive the pawls 140, and hence the pawl carrier 144 and the crankshaft 116, to which the pawl carrier is keyed, one half rotation or 180°. During the down stroke of the slide 48 and the rack 148 from the position represented in Fig. 17 to the position represented in Fig. 18, the ratchet teeth drive (see Fig. 19) the pawls, and during the up stroke of the slide the ratchet teeth move idly from the pawls.

The effect of this step-by-step rotation of the crankshaft 116 and the consequent rocking of the tripper 106 will be understood by examination of the cycle of movements represented in Figs. 15, 16, 20 and 21 and in Figs. 17, 18, 19, 22 and 23. At this point it should be noted that in Figs. 15 to 23, inclusive, the mechanism is viewed from the opposite direction as compared with Figs. 6 and 7.

In Figs. 15 and 17 the slide 48 (which carries the rocker 64) is nearing the upper end of its stroke, the tripper 106 has been rocked contra-clockwise thus lowering the rear pin 104R and the latter has been engaged by the roller 101R on the rocker 64. This engagement of the pin and roller rocks the rocker 64 contra-clockwise, and with the rocker in this position (now see Figs. 16 and 18) the slide 48 descends with the rocker 64. During this descent, the rack 148 turns the pinion 134 contra-clockwise, the crankshaft 116 is turned one-half turn, and the tripper 106 is rocked clockwise to the position represented in Fig. 16. The slide 48 is now at the bottom of its stroke.

At this point, it should be observed that the arm 74 of the rocker 64 carries a pin 152 which now contacts with the rear side of a fixed abutment 154 on the frame, and that, as a consequence, the rocker is held firmly in this position while the swaging die is striking the work.

The description of the cycle will now be continued, reference being had at first to Figs. 20 and 22. With the rocker 64 still in the same angular position, the slide 48 rises, the rack 148 turns the pinion 134, but the ratchet does not cause rotation of the crankshaft, and the tripper 106 remains in the same angular position. It follows that this time the front roller 101F on the rocker 64 strikes the front pin 104F on the tripper 106, thus causing the rocker 64 to be rocked clockwise. In the meantime, the locking pin 152 carried by the arm 74 of the rocker 64 has risen above the abutment 154 and has swung to the front of the latter (see Fig. 21).

With the rocker 64 in the angular position represented in Fig. 20, but with the tripper 106 in the position shown in Fig. 21, the slide 48 descends, carrying with it the rack 148 and the rocker 64. The descent of the rack 148 rotates the pinion 134 contra-clockwise (now see Fig. 19), the pinion rotates the ratchet 136 one-half turn (180°), the ratchet teeth 138 drive the pawls 140 and pawl-carrier 144 one-half turn, and the pawl-carrier, being keyed to the crankshaft 116 rotates the latter one-half turn. The crank-pin 114 swings through one-half turn and acting through the sliding block 112 in the slot 110 of the tripper 106 rocks the latter from the position shown in Fig. 21 to the position shown in Fig. 20. In the meantime, the descent of the slide 48, carrying with it the rocker 64, has caused the pin 152 carried by the arm 74 of the rocker, to descend on the rear side of the abutment 154. As a consequence, the rocker is held firmly in this position while the swaging die is striking the work.

The slide 48 now rises, carrying with it the rocker 64, from the position represented in Fig. 20 to the position represented in Fig. 15. The slide 48, in ascending, carries the rack 148 upwardly from the position represented in Fig. 23 to the position represented in Fig. 17, thus rotating the pinion 134 clockwise, but the ratchet teeth 138 (see Fig. 19) now recede from the pawls 140 and hence the crankshaft is not rotated and the tripper 106 is not rocked but remains in the position represented in Fig. 21 until further ascent of the rocker 64, as described in the beginning of the cycle, causes the roller 101R to strike the pin 104R as in Fig. 15.

Although the cycle is now complete, it is to be remembered that there is still to be considered the cycle of the lower unit in its relation to the hereinbefore described cycle of the upper unit. However, before describing the cycle of the combined units, I will first describe mechanism for controlling the angularity of the die-holder 62 as it is carried horizontally to and fro by the rocker 64.

It will be remembered that the die-holder 62 (see Fig. 4) is pivoted on a pin 66 on the rocker 64 so that the angular position of the die-holder will change from time to time during the cycle, so as to present the die in different angular positions with relation to the work. The control of this angularity is due to several factors now to be described. The first of these factors is the shape of the die-carrier 62 itself which, as shown in Fig. 4, has opposite faces 156 which diverge downwardly, i. e., toward the working end of the die 56. These diverging faces are disposed between generally parallel faces 158 of two abutments such as blocks 160 which limit lateral movement of the die-carrier 62 and also determine its angularity.

It will be recalled that the rocking of the rocker 64 is caused by the alternate contacting of its rollers 101F and 101R with the pins 104F and 104R of the tripper 106. The resultant operation is a sort of tripping action which renders desirable a snap-action or spring-biasing arrangement tending to continue the swing of the rocker 64 and to bring one of the faces 156 of the die-carrier 62 into engagement with one of the faces 158 of one or the other of the abutments 160. This snap-action or spring-biasing arrangement will now be described, reference being had at first to Fig. 5.

It will be remembered that the slide 48 is hollow and carries within it a housing 82 having two side walls 78. By examination of Fig. 5, it will be observed that each of the walls 78 is provided with an aperture 162 and that a pin 164 passing through the rocker 64 has its ends received in these apertures and that they are provided with grooves 166. Referring now to Fig. 26, it is to be noted that the groove 166 receives a shoe 168 which, as viewed in Fig. 24, is arc-shaped to fit the reduced portion of the pin 164. The shoe 168 is a part of a resiliently telescopic arrangement including a pivot 170 somewhat like a knife-edge pivot which, as shown in Figs. 24 and 25, is seated in a depression 180 at the bottom of the aperture 162. In the example shown, the pivot 170 has a shank 182 slidable within a tubular shank 184 on the shoe 168, and a spring 186 surrounding the same urges the shoe into the groove 166 and urges the pivot into the depression 180.

There is thus constituted a toggle in which the described, telescopic arrangement is one link of the toggle connecting the pivot 170 and the fixed depression 180 with the laterally movable pin 164 carried by the rocker 64, and the other link is that portion of the rocker 64 which lies between the pivot pin 164 and the fulcrum pin 72. The geometry of the arrangement will be evident from a comparison of Figs. 24 and 25 in which it will be observed that the resiliently extensible link of the toggle is represented by the line A—B, and the other link is represented by the line B—C. In Fig. 24, the thrust of the spring 186, tending to extend the link of which it is a part, urges the pivot pin 164 toward the left as viewed in this figure and urges the left-hand face 156 of the die-carrier 62 against the face 158 of the left-hand control block 160. In fact, the moment that the axis of the pivot pin 164 passes to the left of the line AC, there will be a snap-action of the toggle to its final position represented in Fig. 4. This movement is, of course, initiated by the tripper 106 and completed by the spring-biasing arrangement of the toggle. A like but opposite action occurs when the axis of the pivot pin 164 passes to the right of the line AC.

In the geometry of the arrangement, it should also be observed that during this side to side motion, the pivot pin 66 on which the die-carrier 62 is pivoted allows the latter to rock so that its surfaces 156 will always lie flatwise against the surfaces 158, respectively. In Figs. 24 and 25 the axis of the pivot pin 66 is represented by the point D and the axis of the cylindrical work such as the chain link is represented by the point E. Considering then the triangle CDE it is evident that the line DE crosses and recrosses the line CE, i. e., it is first on one side and then on the other so that the die 56, after striking a blow in one angular position, is shifted to another angular position where it strikes a blow, after which it returns to the first position, and so on. Thus a considerable surface of the work is covered by the action of the die.

Accuracy of this lateral and angular movement of the die-carrier 62 is assured my mechanism, now to be described, for adjusting the control blocks 160 toward and from each other, as well as angularly. Referring to Fig. 4, it will be observed that the control blocks 160 are provided at their upper ends with vertical slots 188 in which blocks 190 are mounted to slide vertically.

Upper eccentrics 192 turn in the blocks 190, respectively, and lower eccentrics 194 turn directly in the lower ends of the control blocks 160, respectively. All four of these eccentrics are independently adjustable by means now to be described, reference being had at first to Fig. 9 which illustrates the adjusting mechanism for the front control block 160.

The upper eccentric 192 is formed on a shaft 196 which is rotatably supported by the vertically reciprocatory slide 48 and passes loosely through the left-hand wall 78 of the housing 82. The shaft 196 has a reduced portion 198 which turns in a bushing 200 supported by the slide 48 and passing loosely through the right-hand wall 78 of the housing 82. A pinion 202 formed on or secured to the shaft 196 meshes with a rack 204, sliding motion of which turns the pinion, the shaft and the upper eccentric 192.

The lower eccentric 194 is formed on a shaft 206 which is rotatably supported by the slide 48 and passes loosely through the left-hand wall 78 of the housing 82. The shaft 206 has a reduced portion 208 which turns in a bushing 210 supported by the slide 48 and extending loosely through the right-hand wall 78 of the housing 82. A pinion 212 formed on or secured to the shaft 206 meshes with a rack 214, sliding motion of which turns the pinion, the shaft and the lower eccentric 194.

The racks 204 and 214 are moved lengthwise independently by appropriate mechanism such as screws 218 and 220 threaded into a lug 222 (see Fig. 8) and connected to the respective racks as by being grooved to receive slotted lugs 224 and 226 formed on or secured to the respective racks and extending through an aperture 228 in a plate 230 which guides and holds the racks in place.

Figure 10:
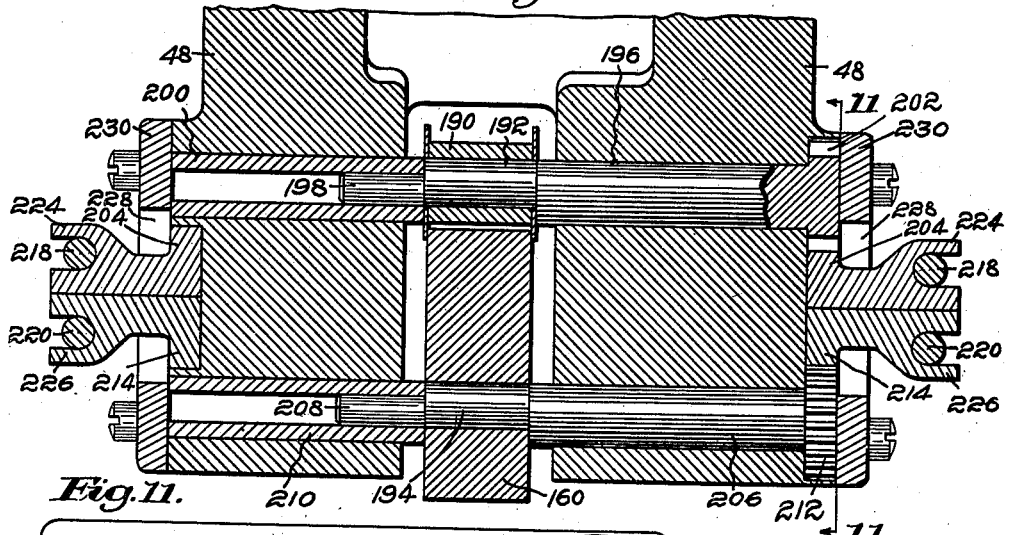
Fig. 10 is a vertical sectional view on line 10—10 of Fig. 4.
Figure 11:
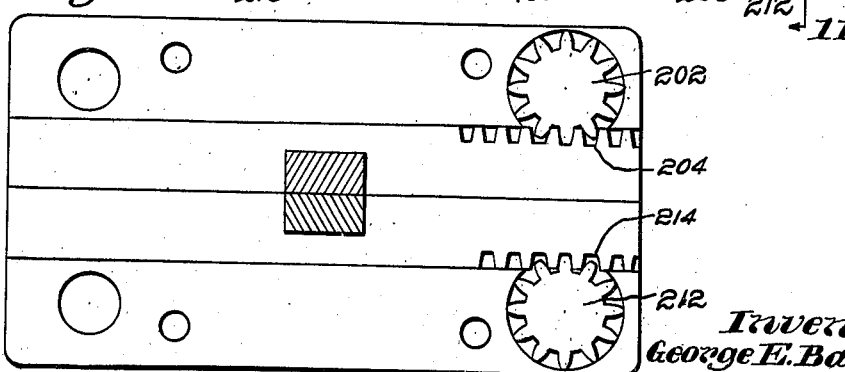
Fig. 11 is a vertical sectional view on line 11—11 of Figs. 9 and 10.

The adjusting mechanism for the rear control block 160 illustrated in Fig. 10 is the same as that shown in Fig. 9 for the front control block (except that it is reversely arranged, and except that the walls 78 are not present) and it is therefore deemed unnecessary to describe the second set of parts which, however, are designated by like numerals.

The lower unit 40L is like the hereinbefore described upper unit 40U except that, to shield certain parts of the lower unit from particles of metal dropping from the upper unit, the lower unit (see Fig. 27) is provided with a guard 232 suitably secured to the die carrier 62 of the lower unit. The dimensions of this guard are such that it overlies the spaces between the rocking die carrier 62 and the control blocks 160 between which the die carrier plays to and fro. As the die carrier rocks and moves laterally, the guard moves with it but always overlies the spaces about the die carrier.

Returning now to the vertical reciprocation of the slide 48, and referring to Figs. 1 and 2, it will be remembered that the slide is actuated by a link 50 connecting a pivot 52 on the slide to an arm 54. The mechanism for rocking the arms 54 of the upper and lower units and connecting them to operate in synchronism will now be described, reference being had at first to the upper portions of Figs. 1 and 2. The arms 54 are conveniently secured as by keying to rockshafts 234 suitably mounted in bearings 236, between which the arms 54 are disposed. These rockshafts are caused to rock in synchronism, though in opposite directions, by appropriate mechanism such as duplicate sets of arms 238 suitably secured as by keying to outer ends of the rockshaft, and the upper and lower pairs of arms are connected by links 240. Power is applied to one of the rockshafts 234, herein the upper one, as by an arm 242 conveniently formed integral with the upper arm 54 and connected by a link 244 to a crank-pin 246 of a crankshaft 248 which is mounted in bearings 250 and has on it a flywheel 252.

The coordinated operation of the upper and lower units will readily be understood from an examination of Figs. 27 to 30, inclusive, which illustrate the complete cycle and show how it is that the upper and lower dies strike the intervening work, then assume another angular position, and strike the work again, after which they return to the first position.

Fig. 27 shows the upper slide 48 ascending and the lower slide 48 descending, i. e., receding from the relative positions shown in Fig. 30. It will be observed that in Fig. 27 the upper, front roller 101F is engaged with the upper, front pin 104F, and that the lower, rear roller 102R is engaged with the lower, rear pin 104R. This causes tripping of the upper and lower die-rockers 64, so that the upper die-carrier 62 is swung toward the right and the lower die-carrier 62 is swung toward the left. The motion of the slides 48 is now reversed (see Fig. 28) the slides approach each other, and the dies 56, in their new angular position, now strike the intervening work.

After the blow has been struck, the slides 48 recede from each other (see Fig. 29) and toward the ends of their respective travels, the upper, rear roller 102R strikes the upper, rear pin 104R and the lower, front roller 101F strikes the lower, front pin 104F. This causes tripping of the upper and lower die-rockers 64 once more (but in the opposite directions as compared with the first time already described) so that the upper die-carrier 62 is swung toward the left and the lower die-carrier 62 is swung toward the right. The motion of the slides 48 is now reversed (see Fig. 30), the slides approach each other, and the dies 56, in their new angular position, strike the intervening work. The parts now return to the positions shown in Fig. 27 and the cycle is complete.

Having described one embodiment of the invention, what I claim and desire, by Letters Patent, to secure is:

1. In a swaging machine, the combination of a swaging die, a toggle arrangement including a die-carrier, a die-rocker and a connecting pivot, a biasing arrangement tending to maintain the axis of said pivot at either side of a neutral position, and means to move said die-carrier toward and from the work.

2. In a swaging machine, the combination of a swaging die, a toggle arrangement including a die-carrier, a die-rocker, and a connecting pivot, means to cause the axis of said pivot to move from side to side of a neutral position and to move toward and from the work, and a spring biasing arrangement tending to maintain the axis of said pivot at one side or the other of said neutral position.

3. In a swaging machine, the combination of a swaging die, a toggle arrangement including a die-carrier, a die-rocker, and a connecting pivot, means to cause the axis of said pivot to move from side to side of a neutral position and to move toward and from the work, and means positively to maintain said pivot at each side of said neutral position.

4. In a swaging machine, the combination of a swaging die, a toggle arrangement including a die-carrier, a die-rocker, and a connecting pivot, means to cause the axis of said pivot to move from side to side of a neutral position and to move toward and from the work, and means positively to maintain said pivot at each side of said neutral position, the last-mentioned means including a fixed abutment, and a movable abutment carried by said die-rocker from side to side of said fixed abutment.

5. In a swaging machine, the combination of a swaging die, a toggle arrangement including a die-carrier, a die-rocker, and a connecting pivot, means to cause the axis of said pivot to move from side to side of a neutral position and to move toward and from the work, and means positively to maintain said pivot at each side of said neutral position, the last-mentioned means including a fixed abutment, and a movable abutment which is carried by said die-rocker from side to side of said fixed abutment and which moves toward and from the work when on each side of said fixed abutment.

6. In a swaging machine, the combination of a swaging die, a rocking die-carrier, means to rock said die-carrier to and fro and to move the same toward and from the work, and means to predetermine the extent of lateral movement of said die-carrier and to predetermine its angularity in each of two positions.

7. In a swaging machine, the combination of a swaging die, a rocking die-carrier, means to rock said die-carrier from side to side and to move the same toward and from the work, and two abutments which limit lateral movement of said die-carrier and predetermine its angularity in each of two positions.

8. In a swaging machine, the combination of a swaging die, a rocking die-carrier, means to rock said die-carrier from side to side and to move the same toward and from the work, two abutments which limit lateral movement of said die-carrier and predetermine its angularity in each of two positions, and means to adjust said abutments toward and from each other.

9. In a swaging machine, the combination of a swaging die, a rocking die-carrier, means to rock said die-carrier from side to side and to move the same toward and from the work, two abutments which limit lateral movement of said die-carrier and predetermine its angularity in each of two positions, and means to adjust said abutments angularly with relation to each other.

10. In a swaging machine, the combination of a swaging die, and mechanism to cause said die to move toward and from the work in one angular position, then to assume another angular position, and then to move toward and from the work, said mechanism including a rocking tripper.

11. In a swaging machine, the combination of a swaging die, and mechanism to cause said die to move toward and from the work in one angular position, then to assume another angular position, and then to move toward and from the work, said mechanism including a rocking tripper, a reciprocatory member, and means to utilize reciprocation of said member to rock said tripper.

12. In a swaging machine, the combination of a swaging die, and mechanism to cause said die to move toward and from the work in one angular position, then to assume another angular position, and then to move toward and from the work, said mechanism including a rocking tripper, a reciprocatory member, and means to utilize reciprocation of said member to rock said tripper, said means including pawl and ratchet, a crank which rocks said tripper, and a rack and pinion which causes said pawl and ratchet to impart a step-by-step rotative movement to said crank.

13. In a swaging machine, the combination of a frame presenting a guide, a slide guided by said guide, mechanism to reciprocate said slide, a die-tripper pivotally supported by said frame, mechanism to utilize reciprocation of said slide to rock said die-tripper, a fulcrum pin carried by said slide, a die-rocker fulcrumed on said pin and utilizing reciprocation of said slide to cooperate with said die-tripper to produce a rocking movement of said die-rocker, a die-carrier pivoted on said die-rocker to rock to and fro, die-carrier controlling abutments contacted alternately by said die-carrier and predetermining its lateral and angular movements, a biasing arrangement tending to cause said die-rocker to maintain said die-carrier in contact with one or the other of said abutments, and a die carried by said die-carrier and partaking of the reciprocation of said slide and of the rocking of said die-rocker.

14. In a swaging machine, the combination of a pair of cooperative swaging dies to engage opposite sides of the work, and instrumentalities to cause a predetermined cycle of movement in which said dies are caused to approach and recede from each other and to assume different angular positions with relation to the intervening work by turning about axes outside themselves.

15. In a swaging machine, the combination of a pair of cooperative swaging dies to engage opposite sides of the work, and instrumentalities to cause a predetermined cycle of movement in which said dies are caused to approach each other in one angular position, then to recede from each other, then to assume another angular position by turning about axes outside themselves, then to approach each other, and finally to recede from each other.

16. In a swaging machine, the combination of a pair of cooperative swaging dies to engage opposite sides of the work, and instrumentalities to cause said dies to approach each other in one angular position, then to recede from each other, then to assume another angular position, then to approach each other, and finally to recede from each other, said instrumentalities including two slides arranged to reciprocate toward and from each other, a die-rocker carried by each slide, a die-carrier pivoted to each die-rocker, a rocking die-tripper associated with each slide, means to utilize the sliding movement of each slide to rock said die-tripper, cooperative means on each die-tripper and its associated die-rocker to utilize sliding movement of the associated slide to produce rocking movement of the associated die-rocker, and means to predetermine the lateral and angular movement of each die-carrier under the influence of its die-rocker.

17. In a swaging machine, the combination of a swaging die, and means to cause said die to move in a predetermined cycle, first, to and from the work in one predetermined, angular position, then to another predetermined, angular position by turning about an axis outside itself, and then to and from the work.

18. In a swaging machine, the combination of a swaging die, a rocking die-carrier which changes the angular relationship of said die to the work by rocking about an axis outside of the work, means to rock said die-carrier through a predetermined angular distance about said axis from one predetermined, angular position to another predetermined, angular position, and means to move said die-carrier and die toward and from the work in each of said predetermined positions.

19. In a swaging machine, the combination of a swaging die, a toggle arrangement including a rocking die-carrier, a die-rocker, and a pivot connecting said die-carrier to said die-rocker, and means to cause said toggle to move bodily toward and from the work and the axis of said pivot to move from side to side of a neutral position in the path of movement of said toggle toward and from the work.

20. In a swaging machine, the combination of a swaging die, means to cause said die to move in a predetermined cycle, first, to and from the work in one predetermined angular position, then to another predetermined angular position by turning about an axis outside itself, and then to move to and from the work in such other angular position, and means positively to predetermine each angular position.

21. In a swaging machine, the combination of a swaging die, a rocking die-carrier which changes the angular relationship of said die to the work by turning about an axis outside itself, means to rock said die-carrier through a predetermined, angular distance about said axis from one predetermined, angular position to another predetermined, angular position, and means positively to predetermine each angular position.

22. In a swaging machine, the combination of a pair of cooperative swaging dies to engage opposite sides of the work, and instrumentalities automatically to cause a predetermined cycle of movement in which said dies are caused automatically to approach and recede from each other in coincidence and automatically to assume different angular positions with relation to the intervening work by automatically turning about axes outside themselves.

23. In a swaging machine, the combination of a pair of cooperative swaging dies having cylindric surfaces to engage opposite sides of cylindrical work, and instrumentalities to cause a predetermined cycle of movement in which said dies are caused to approach and recede from each other by equal, predetermined amounts and to assume different, predetermined, angular positions with relation to the intervening work by turning through predetermined equal, angular distances about axes outside themselves.

24. In a swaging machine, the combination of a pair of cooperative swaging dies to engage opposite sides of the work, and instrumentalities automatically to cause a predetermined cycle of movement in which said dies are caused automatically to approach each other by predetermined distances in one predetermined, angular position, then to recede from each other by predetermined distances, then to assume another predetermined, angular position by turning about axes outside themselves, then automatically to approach each other by predetermined distances, and finally to recede from each other by predetermined distances.

25. In a swaging machine, the combination of a pair of cooperative swaging dies to engage opposite sides of the work, and instrumentalities automatically to cause a predetermined cycle of movement in which said dies are caused automatically to approach each other by equal, predetermined distances in one predetermined, angular position, then to recede from each other by equal, predetermined distances, then to assume another predetermined, angular position by turning through predetermined, equal, angular distances about axes outside themselves, then automatically to approach each other by equal, predetermined distances, and finally to recede from each other by equal, predetermined distances.

26. In a swaging machine, the combination of a swaging die, and means automatically to cause said die to move in a predetermined cycle, first, to and from the work in one predetermined, angular position, then to another predetermined, angular position by turning through a predetermined, angular distance about an axis outside itself, and then to and from the work.

27. In a swaging machine, the combination of a swaging die, and means automatically to cause said die to move in a predetermined cycle, first, to and from the work a predetermined distance in one predetermined, angular position, then to another predetermined, angular position by turning through a predetermined, angular distance about an axis outside itself, and then to and from the work a predetermined distance.

28. In a swaging machine, the combination of a swaging die, a rocking die-carrier which changes the angular relationship of said die to the work by rocking about an axis outside of the work, means automatically to rock said die-carrier through a predetermined, angular distance about said axis from one predetermined, angular position to another predetermined, angular position, and means automatically to move said die-carrier and die toward and from the work a predetermined distance in each of said predetermined positions.

29. In a swaging machine, the combination of a swaging die, means automatically to cause said die to move in a predetermined cycle, first, to and from the work a predetermined distance in one predetermined, angular position, then through a predetermined, angular distance to another predetermined, angular position by turning about an axis outside itself, and then to move to and from the work a predetermined distance in such other angular position.

30. In a swaging machine, the combination of a swaging die, a rocking die-carrier which changes the angular relationship of the die to the work by turning about an axis outside the die, means automatically to rock said die-carrier through a predetermined, angular distance about said axis from one predetermined, angular position to another, and means automatically to cause said die-carrier and die to move a predetermined distance toward and from the work in each of said predetermined positions.

GEORGE E. BARSTOW.